United States Patent [19]

Hemena et al.

[11] Patent Number: 5,561,596
[45] Date of Patent: Oct. 1, 1996

[54] AC LINE STABILIZATION CIRCUITRY FOR HIGH POWER FACTOR LOADS

[75] Inventors: William Hemena, Lexington, Ky.;
Randhir S. Malik, S. Burlington, Vt.

[73] Assignee: International Business Machines Corporation, Armonk, N.Y.

[21] Appl. No.: 200,054

[22] Filed: Feb. 22, 1994

[51] Int. Cl.$^6$ ................................ H02H 7/10; H01C 7/12
[52] U.S. Cl. ................................ 363/50; 361/118
[58] Field of Search ................................ 363/50, 52, 53, 363/55, 56; 361/18, 111, 117, 118

[56] References Cited

U.S. PATENT DOCUMENTS

| | | | |
|---|---|---|---|
| 4,091,434 | 5/1978 | Suzuki et al. | 361/100 |
| 4,327,405 | 4/1982 | Clark | 363/56 |
| 4,331,994 | 5/1982 | Wirth | 361/56 |
| 4,412,278 | 10/1983 | Cambier | 363/126 |
| 4,524,413 | 5/1985 | Ikenoue et al. | 363/127 |
| 4,573,113 | 2/1986 | Bauman | 363/48 |
| 4,616,302 | 10/1986 | Mandelcorn | 363/50 |
| 4,802,053 | 1/1989 | Wojtak et al. | 361/85 |
| 4,811,189 | 3/1989 | Harvest et al. | 363/53 |
| 4,811,190 | 3/1989 | Keir et al. | 363/60 |
| 4,816,982 | 3/1989 | Severinsky | 363/44 |
| 4,821,166 | 4/1989 | Albach | 363/89 |
| 4,837,672 | 6/1989 | Donze | 363/143 |
| 4,843,533 | 6/1989 | Roof et al. | 363/55 |
| 4,933,803 | 6/1990 | Kalivas | 361/85 |
| 5,115,185 | 5/1992 | Fraidlin et al. | 323/207 |
| 5,341,282 | 8/1994 | Brambilla et al. | 363/50 |
| 5,388,021 | 2/1995 | Stahl | 361/56 |
| 5,392,188 | 2/1995 | Epstein | 361/118 |

Primary Examiner—Matthew V. Nguyen
Attorney, Agent, or Firm—Arthur J. Samodovitz

[57] ABSTRACT

AC line stabilization circuitry is provided for high power factor loads for protecting bulkless AC/DC converters against lightning or other energy surges while simultaneously providing additional holdover capacity for AC line drop-out conditions. The stabilization circuitry diverts energy surges in the line caused by lightning or other conditions from being applied to the input of the converter by charging a capacitor, and the stabilization circuitry further provides enhanced holdover capacity during AC line drop-out conditions. The stabilization circuitry in accordance with the present invention utilizes simple sensing means operatively associated with a switch coupled to stabilization means for providing a stabilized input voltage to a bulkless AC/DC converter. The present invention further contemplates a simplified circuit including an isolating diode, a bulk capacitor and a reset network which enables the power factor to remain near unity during normal operation because the isolated bulk is peak charged and does not affect operation of the converter.

24 Claims, 2 Drawing Sheets

AC LINE STABILIZATION CIRCUITRY FOR HIGH POWER FACTOR LOADS

BACKGROUND OF THE INVENTION

The present invention relates generally to AC line stabilization circuitry for high power factor loads. More specifically, the invention provides AC line stabilization circuitry for protection of bulkless AC/DC converters from failure caused by lightning or other energy surges applied to the line, while simultaneously providing additional holdover capacity for line drop-out conditions.

Conventional bulkless converters do not include large electrolytic capacitors to absorb lightning and other energy surges applied to electrical lines. As a result, high peak input capacitor voltages applied to an AC/DC converter may result in a failure. Moreover, bulkless converters known to the art require, large capacitors at the output of the converters to provide sufficient holdover as the AC line voltage drops out. It is the primary object of the present invention to provide stabilization circuitry for bulkless converters to more efficiently absorb lightning and energy surges to prevent capacitor voltage applied to the input of the converter to rise to unacceptably high peaks. It is a further object of the invention that said stabilization circuitry further provide a holdover during AC line voltage drop-out utilizing a smaller electrolytic capacitor than heretofore known to the art. Other objects and advantages of the present invention will become apparent to those skilled in the art.

It is noted that AC line stabilization circuits for providing a wide range of circuit stabilization features are generally well known to the art. Such known circuitry includes, for example, surge protection circuits, voltage suppression circuits and circuit breakers (for both high and low power factor loads) to protect circuitry coupled to a AC line during power-up conditions, to provide protection from lightning and other energy surges applied to the line; and circuits for providing supplementary hold-up time capacity to drive a given load in the event of power outages in the AC line.

Specific examples of the aforementioned circuitry representing the current state of the prior art, include U.S. Pat. No. 4,091,434, issued on May 23, 1978 to Suzuki et al for a surge current protection circuit; U.S. Pat. No. 4,573,113 issued on Feb. 25, 1986 to Bauman for a surge protection system for a DC power supply during power-up; U.S. Pat. No. 4,837,672, issued on Jun. 6, 1989 to Donze disclosing an electronic switched power supply for automatically adjusting the operation thereof to produce a fixed output voltage as input voltages of different magnitudes are applied thereto at different times; U.S. Pat. No. 4,811,189, issued on Mar. 7, 1989 to Harvest et al, which discloses an AC rectifier circuit with means for limiting the rectified voltage; U.S. Pat. No. 4,524,413, issued on Jun. 18, 1985 to Ikenoue et al, for an AC rectifier having a semi-conductor active rectifying element; U.S. Pat. No. 4,412,278, issued on Oct. 25, 1983 to Cambier, et al, for a AC to DC converter using polarized input isolation capacitors; and U.S. Pat. No. 4,327,405, issued on Apr. 27, 1982 to Clark, Jr., disclosing a voltage suppression circuit for a DC to DC voltage converter circuit.

None of the aforementioned prior art references discloses or suggests the AC line voltage stabilization circuitry in accordance with the present invention. Briefly stated, the Harvest et al patent does not disclose a power factor correction circuit; the Ikenoue et al patent provides an AC rectifier circuit with an overvoltage protection circuit which shuts the circuit down; the Donze patent discloses a switched mode power supply with output voltage control, but does not provide power factor correction; the Clark, Jr. patent discloses a voltage suppression circuit responsive to voltage polarity reversal in a transformer primary, and thus is not directly relevant to the invention disclosed and claimed herein; the Cambier et al patent discloses an AC to DC converter using polarized input isolation capacitors which is not directly relevant to the invention disclosed herein; the Suzuki et al patent discloses a current suppression circuit, not a voltage suppression circuit in accordance with the present invention, and further employs a DC/DC convertor; and the Bauman patent discloses a surge protection system for a DC power supply in which AC line voltage is filtered through an LC filter having a shunt-connected filter capacitor, and thus is not directly relevant to the circuitry provided by the invention disclosed herein. The aforementioned objects and advantages of the AC line stabilization circuitry in accordance with the present invention will now be discussed in greater detail as follows.

SUMMARY OF THE INVENTION

In accordance with the first preferred embodiment of the invention, AC voltage line stabilization circuitry is provided for high power factor loads, and more particularly for protecting bulkless AC/DC converters against lightning and other energy surges while simultaneously providing additional holdover capacity for AC line voltage drop-out conditions. The circuitry employs a bilateral transistor switch selectively actuated by the outputs of first and second comparators in response to predetermined conditions for controlling discharge of an electrolytic capacitor across the input of the converter to prevent voltage surges in the line from reaching the input of the converter, and to provide increased holdover during AC line dropout conditions. The input of the first comparator is coupled to the output of a full wave rectifier, while the input of the second comparator samples the average AC line voltage. The bilateral switch is off when the AC line is turned on and the capacitor is charged through a charging resistor electrically coupled thereto for limiting current drawn from the AC line at the time it is turned on. When the AC line voltage disappears for a half cycle, the voltage sensed at the output of one comparator, which is operatively associated with the bi-lateral switch, causes the switch to turn on. When the switch is turned on, the capacitor applies a voltage across the input of the converter through the switch during AC line voltage dropout, and the holdover voltage during the drop-out condition can be provided by a smaller capacitor than heretofore utilized in AC line stabilization circuitry for high power loads. When an energy surge, such as increased energy due to lightning, is realized on the line, the other comparator is actuated to turn on the bilateral switch such that the voltage surge is stored in the capacitor and not applied to the input of the converter.

In a further embodiment of the present invention, a simplified AC line stabilization circuit includes an isolating diode, a bulk capacitor and a reset network. The simplified circuit provides protection against lightning and other energy surges in an AC line coupled to the input of an AC/DC converter, without providing the additional hold-up time during AC line voltage drop-out condition as provided by the circuitry comprising the first embodiment of the invention.

DESCRIPTION OF THE BEST MODES FOR CARRYING OUT THE INVENTION

Figure 1:
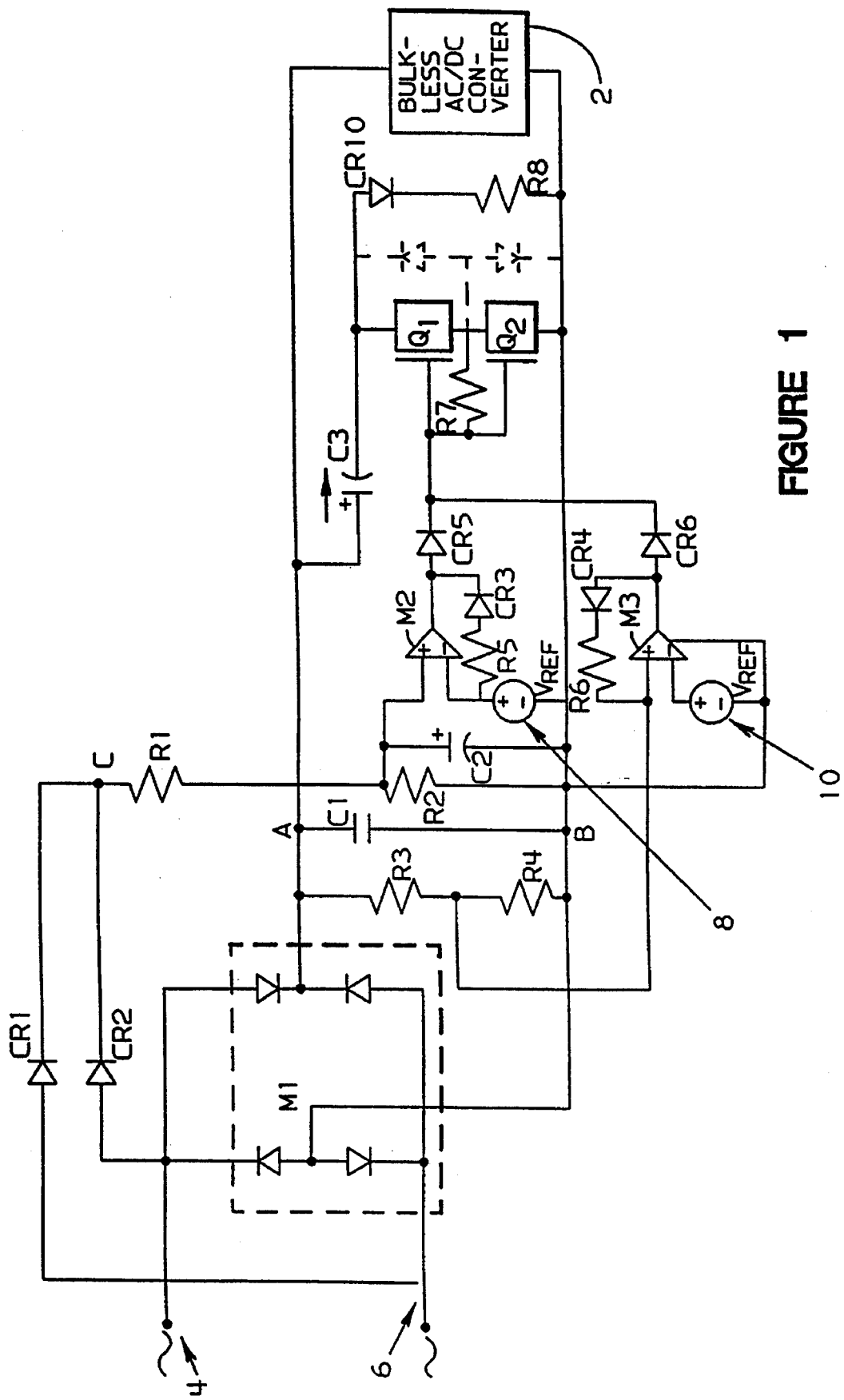
FIG. 1 of the drawing illustrates an AC line stabilization circuit, in accordance with a first preferred embodiment of the present invention, for protecting bulkless AC/DC convertors against energy surges in the line, and for simultaneously providing additional holdover capacity for AC line drop-out conditions.
Figure 2:
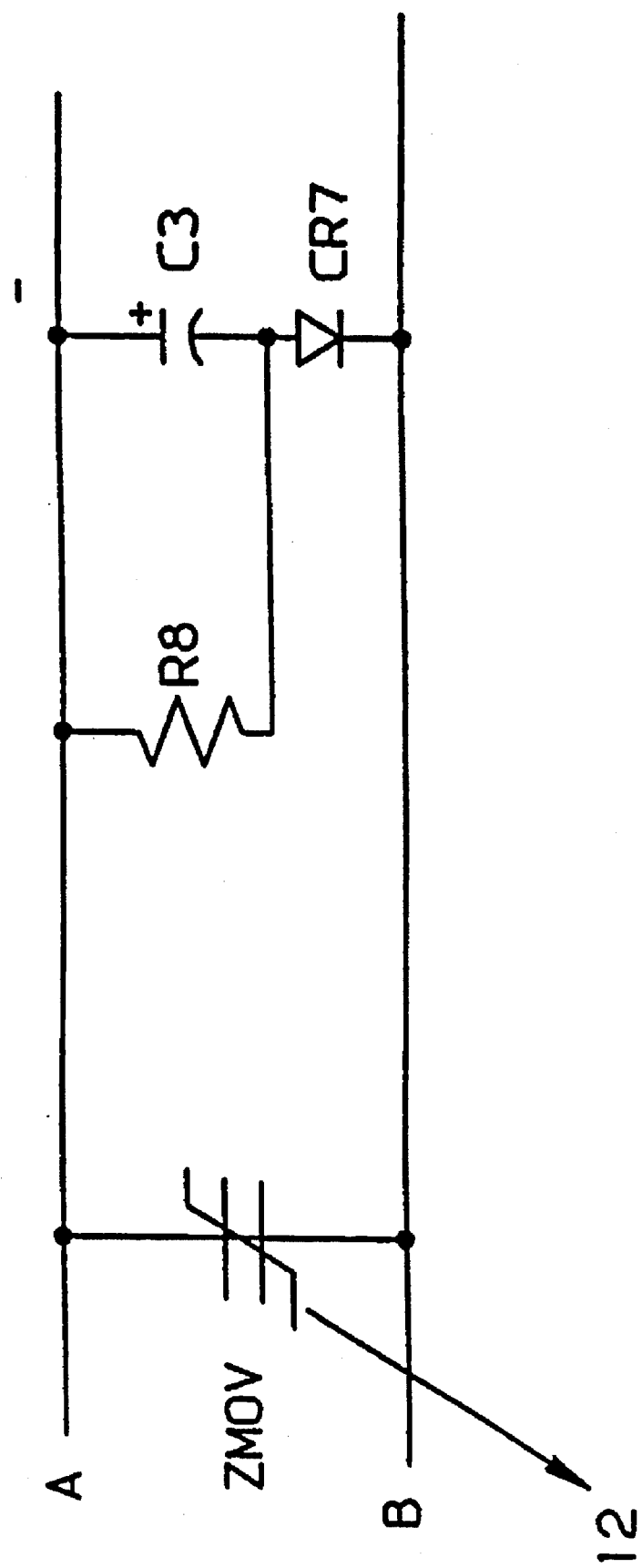
FIG. 2 illustrates AC line stabilization circuitry in accordance with another preferred embodiment of the invention, for providing only energy surge protection but not additional hold-over capacity for AC line drop-out condition.

FIGS. 1 and 2 of the drawing illustrate the preferred embodiments of AC line stabilization circuitry, in accordance with the present invention. FIG. 1 illustrates a first embodiment of the invention which protects bulkless AC/DC converters against lightning or other energy surges and simultaneously provides additional holdover capacity during AC line drop out conditions. The circuitry includes means for sensing loss of AC line voltage for a time period exceeding a first predetermined time threshold value (e.g., at least one half cycle to avoid false sensing of AC line loss when sensing a pulsating, full wave rectified input signal); means for determining when the AC line voltage exceeds a predetermined voltage threshold value (e.g., a preset reference voltage); and a voltage clamp, coupled to and controlled by the means for sensing and determining, for actuating transistor switch means for switching the stabilization means, such as a capacitor, into circuit for providing stabilization in accordance with current conditions existing in the circuit (e.g., surge protection from lightning or other energy surges in the line, line voltage variation, additional hold-up time when AC line drop-out conditions occur), to the full wave rectified line voltage and protection against energy surges for the AC/DC converter load.

FIG. 2 of the drawing illustrates an alternative embodiment of the invention providing a simplified circuit for protection of a converter from lightning and other energy surges in the line, but without providing additional holdup time during AC line dropout conditions. The preferred embodiment of the simplified circuit illustrated by FIG. 2 of the drawing includes isolating means (e.g., an isolating diode), charged storage means (e.g., a bulk capacitor), and means for resetting the circuit, as for example, a bleed or reset network, for resetting the circuit to normal line conditions after the capacitor has been charged to divert a surge in line voltage from being applied to the input of a converter.

Referring now to FIG. 1 of the drawing, a lightning surge clamp and holdover circuit in accordance with a first preferred embodiment of the present invention is electrically coupled to a bulkless AC/DC converter designated by reference numeral 2. AC line voltage is applied to input terminals 4 and 6 across a conventional full wave rectification bridge formed from four rectifiers and generally designated as M1. Two parallel diodes CR1 and CR2 are electrically coupled to the full wave rectifier M1 (and the input thereto) for sensing loss of AC line voltage for at least one half cycle. Resistors R1 and R2 are arranged in the circuit to form a voltage divider for detecting loss of AC line voltage for greater than a predetermined period of time. A capacitor C2 is provided to develop a sample of the average value of AC line voltage. The capacitor C2 is coupled to the negative input of a comparator M2, while a predetermined reference voltage established by a supply voltage 8 is coupled to the positive input of the comparator M2. A resistor R5 and diode CR3 combination is electrically coupled between the positive input of the comparator M2 and the output thereof to create a hysteresis level to prevent false actuation of the comparator M2 as a result of noise or other conditions in the line which would otherwise result in false actuation. Under normal conditions, the voltage across capacitor C2 and thus the voltage applied to the negative input terminal of comparator M2 is greater than the reference voltage applied to the positive terminal of the comparator M2. Therefore, under normal operating conditions, the output of comparator M2 is low. The low output of comparator M2 is electrically coupled to the input of a bilateral transistor switch formed from transistors Q1 and Q2 to maintain the switch in an "off" state. When the voltage across capacitor C2 decreases below the value of the reference voltage 8, the output of the comparator M2 is driven high and the bilateral transistor switch coupled to the output of the comparator M2 is switched into its "on" mode. Therefore, the voltage across capacitor C2, which samples the average value of the AC line voltage, determines the state of the bilateral transistor switch formed from the transistors Q1 and Q2.

A second comparator designated as M3 is electrically coupled at its positive input to the output of the full wave rectifier M1 through a voltage divider formed by resistors R3 and R4. A hysteresis level is set by a combination of resistor R6 and diode CR4 electrically coupled between the positive input and the output of the comparator M3. The negative input of the second comparator is coupled to a voltage source 10 for providing a predetermined voltage reference threshold. The output of comparator M3 is electrically coupled to the input of the bilateral switch formed from transistors Q1 and Q2. Under normal operating conditions, the value of the reference voltage 10 exceeds the rectified voltage from the output of the full wave rectifier applied to the positive input of the comparator M3, and the output of the comparator M3 is low. The low output, which is electrically coupled to the bilateral switch Q1 and Q2, turns the switch into its "off" state. When the rectified line voltage applied to the input of comparator M3 exceeds the reference voltage 10, the output of the comparator 3 goes high and turns the bilateral switch Q1 and Q1 into its "on" state. Rectified line voltage from the output of the full wave rectifier M1 is sensed across a capacitor C1 which is coupled to the positive input of the comparator M3. The capacitor C1 is non-polarized and is provided to define a high frequency path for the switch currents developed by the load to isolate the load from the AC line.

A diode CR5 is disposed between the output of comparator M2 and the switch Q1 and Q2, while a diode CR6 is disposed between the output of comparator M3 and the switch Q1 and Q2. The purpose of the output diodes CR5 and CR6 is to decouple the output of comparator M2 from the output of comparator M3.

Transistors Q1 and Q2 are MOSFETs. A resistor R7 connected between the gate and source of transistors Q1 and Q2 is provided to prevent false switching. Transistors Q1 and Q2 form a bilateral switch which permits a capacitor C3 to be charged and discharged, in accordance with circuit conditions, and to prevent discharge of the capacitor C3 during normal circuit operation. A resistor R8 is electrically coupled to capacitor C3 for charging the capacitor when the bilateral transistor switch Q1 and Q2 is in its "off" state.

Operation of the circuit of FIG. 1 is described as follows. AC line voltage is applied to the full wave rectifier M1 across input terminals 4, 6. The rectified AC line voltage at the output of the full wave rectifier M1 is applied across the capacitor C1. It is additionally applied, through a voltage divider defined by resistors R3 and R4, to the positive input terminal of the comparator M3. The input to the negative terminal of the comparator M3 is determined by a preselected threshold reference voltage 10. Under normal circuit conditions, the reference voltage 10 applied to comparator M3 is greater than the voltage applied to the positive input terminal of the comparator M3 from the output of the full wave rectifier M1. Under these conditions, the output of comparator M3, which is electrically coupled to the bilateral transistor switch Q1 and Q2 through the diode CR6, maintains the switch in its "off" state. However, when a surge or other energy peak, (as for example,, caused by lightning), is realized in the AC line, the energy surge is sensed at the output of the full wave rectifier M1 and applied across the capacitor C1. The surge causes the rectified line voltage to increase beyond the reference voltage 10 applied to the negative input terminal of the comparator M3. As the voltage applied to the positive input of the comparator M3 exceeds the predetermined reference voltage 10, the voltage at the output of the comparator M3 goes high. The high output voltage from the comparator is electrically coupled to the input of the bilateral switch, and the bilateral switch is turned on. When the switch is on, the increased voltage in the circuit as a result of the energy surge charges the capacitor C3, through the bilateral switch, to prevent the increased voltage resulting from the surge from being applied to the input of the AC/DC converter. Accordingly, the reference voltage 10 applied to the negative input of the comparator M3 is set at a level to prevent voltage exceeding a maximum level, such as that caused by energy surges, from being applied to the input of the AC/DC converter.

Still referring to the circuit illustrated by FIG. 1 of the drawing, when the AC line is turned on, the bilateral switch Q1 and Q2 is normally in its "off" state, and the capacitor C3 is charged through charging resistor R8. In this manner, the current drawn from the AC line, at the time the line is turned on, is limited. The AC line voltage is sampled and applied to the negative (non-inverting) input of the comparator M2 through diodes CR1, CR2 and a voltage divider formed by resistors R1 and R2. During normal operating conditions, the average AC line voltage applied to the negative input terminal of comparator M2 is less than a predetermined reference voltage 8 applied to the positive input of the comparator M2 causing the output of the comparator to stay low. The output of the comparator M2, which is electrically coupled to the bilateral switch Q1 and Q2, causes the switch to remain in its "off" state when the comparator goes low. However, when AC line voltage is not sensed for one half cycle, the voltage applied to the negative (non-inverting) input of the comparator M2 falls below the reference voltage 8 applied to the positive input of comparator M2. The output of the comparator goes high (and stays high) as determined by the hysteresis level set by the combined resistor R5 and diode CR3 coupled between the positive input and output of the comparator M2. The high output of the comparator M2 is electrically coupled to the bilateral switch Q1 and Q2 through diode CR5, to turn the switch into its on state. When the switch is turned on, the capacitor C3 applies a voltage to the input terminals of the AC/DC converter through the switch Q1 and Q2 during AC line dropout conditions to power the converter. The energy stored in capacitor C3 is a high input voltage compared to energy stored at a low voltage level at the output of the AC/DC converter, and thus the size of the capacitor C3 can be smaller than a capacitor at the output of the converter.

In summary, during normal line conditions, the bilateral switch Q1 and Q2 of the circuit of FIG. 1 is off and the capacitor C3 is charged to store a peak or maximum voltage. When an energy surge is applied to the AC line, the switch Q1 and Q2 is turned on as a result of the comparator M3, such that the increased line voltage is applied to the capacitor C3 by charging the capacitor C3 through the bilateral switch, and the voltage surge is not applied to the input of the AC/DC converter. When AC line drop out conditions occur, the bilateral switch Q1 and Q2 is turned on by the comparator M2, enabling the capacitor C3 to discharge through the bilateral switch and apply a voltage across the input of the AC/DC converter to power the converter during AC line dropout conditions.

Referring to FIG. 2 of the drawing, this figure illustrates a simplified circuit providing only surge protection, but not increased holdover capacity for AC line dropout conditions. The circuit of FIG. 2 is formed from an isolating diode CR7, a bulk capacitor C3 which is charged through a resistor R8, and a bleed or reset network designated by the reference numeral 12 to selectively discharge the capacitor C3 after the capacitor has been charged by voltage surges in AC line caused, for example, by lightning. The circuit of FIG. 2 is coupled to the input of an AC/DC converter such that energy surges exceeding a predetermined voltage are effectively absorbed by the network by charging the capacitor C3 and preventing the excess voltage from being applied to the input of the AC/DC converter. After the capacitor C3 has been charged by an energy surge, the reset network 12 is actuated to discharge the capacitor to render the network operational for re-charging the capacitor by the next energy surge.

The circuits of FIGS. 1 and 2 of the drawing illustrate the preferred embodiments of the invention. Other modifications and variations within the scope of the present invention will become apparent to those skilled in the art. Accordingly, the embodiments discussed herein are intended to be illustrative only, and not restrictive of the scope of the invention, that scope being defined by the following claims and all equivalents thereto.

We claim:

1. An electrical circuit for stabilizing AC line voltage during energy surges and for providing holdover during AC line dropout conditions, said circuit comprising:

first circuit means for sensing when said AC line voltage decreases below a first predetermined voltage; second circuit means for sensing when said AC line voltage exceeds a second predetermined voltage;

switch means responsive to said first and second means for sensing; and stabilization means actuated in response to actuation of said switch means.

2. The circuit as claimed in claim 1 wherein said circuit is provided for high power factor loads.

3. The circuit as claimed in claim 2 further including means for electrically coupling said stabilization means to the input of an AC/DC converter.

4. The circuit as claimed in claim 1 wherein said first means for sensing comprises a first comparator having one input thereof coupled to a sampling from said AC line voltage, the output of said first comparator being coupled to said switch means.

5. The circuit as claimed in claim 1 wherein said second means for sensing includes a second comparator having one input thereof coupled to an input of said circuit, the output of said second comparator being electrically coupled to said switch means.

6. The circuit as claimed in claim 5 wherein said input of said second comparator is coupled to a full wave rectifier bridge at said input of said circuit.

7. The circuit as claimed in claim 1 wherein said stabilization means actuated by said switch means comprises a capacitor.

8. The circuit as claimed in claim 1 wherein said switch means comprises a bilateral transistor switch.

9. A method for stabilizing a voltage supply during energy surges and for providing holdover during AC line dropout conditions, said voltage supply comprising a substantial DC component and being derived from said AC line, said method comprising the steps of:

sensing when the AC line voltage decreases below a first predetermined voltage;

sensing when said AC line voltage exceeds a second predetermined voltage;

actuating a switch responsive to the sensing of when said AC line voltage decreases below said first predetermined voltage or exceeds said second predetermined voltage; and providing stabilization means for stabilizing said voltage supply in response to actuation of the switch.

10. The method as claimed in claim 9 further including the step of electrically coupling said stabilization means to an input of an AC/DC converter.

11. The method as claimed in claim 9 further including the steps of providing a first comparator to sense when said AC line voltage decreases below said first predetermined voltage.

12. The method as claimed in claim 9 further including the steps of providing a second comparator to sense when said AC line voltage exceeds said second predetermined voltage.

13. The method as claimed in claim 9 further comprising the step of coupling the AC line to a full wave rectifier bridge to derive said voltage supply.

14. The method as claimed in claim 9 further including the step of providing a capacitor as said stabilization means.

15. The method as claimed in claim 9 further including the step of providing a bilateral transistor switch as said switch.

16. A circuit for stabilizing a voltage applied to a load, said voltage comprising a substantial DC component and being derived from an AC source, said circuit comprising:

a switch;

a capacitor connected in series with said switch, the switch and capacitor series being connected in parallel with said load; and means for sensing when said applied voltage or said AC source rises above a predetermined threshold voltage and in response, activating said switch such that current flows from said applied voltage through said capacitor to dissipate the applied voltage rise or AC source rise, said switch being oriented to complete a path of said current from said capacitor to ground.

17. A circuit as set forth in claim 16 further comprising:

a second switch connected in series with said capacitor, the capacitor and second switch series being connected in parallel with said load; and means for sensing when said applied voltage or said AC source falls below a second predetermined threshold voltage and in response, activating said second switch such that current flows from said capacitor to said load, said second switch being oriented to complete a return path of said current from ground to said capacitor.

18. A circuit as set forth in claim 16 further comprising means, active before said switch is activated, for causing said capacitor to charge to a voltage within an input operating range of said load.

19. A circuit as set forth in claim 16 wherein the sensing means comprises a comparator.

20. A circuit as set forth in claim 16 wherein said load is an AC/DC converter.

21. A circuit as set forth in claim 16 further comprising a diode and resistor connected in series with each other, said capacitor and said AC source, for causing said capacitor to charge to a voltage within an input operating range of said load.

22. A circuit as set forth in claim 17 wherein the first said switch comprises a first FET and said second switch comprises a second FET, said first and second FETs being connected in series with each other.

23. A circuit as set forth in claim 22 wherein said FETs are oriented such that when activated, each of said FETs conducts current toward the other FET.

24. A circuit as set forth in claim 17 wherein the first said switch and said second switch are both activated when the applied voltage rises above the first said predetermined threshold voltage and when the applied voltage falls below said second predetermined threshold voltage to permit bi-directional current flow to said capacitor.

* * * * *